(12) United States Patent
Cheng et al.

(10) Patent No.: US 10,304,482 B2
(45) Date of Patent: May 28, 2019

(54) DEVICES INCLUDING AN OVERCOAT LAYER

(71) Applicant: SEAGATE TECHNOLOGY LLC, Cupertino, CA (US)

(72) Inventors: Yuhang Cheng, Edina, MN (US); Michael Seigler, Eden Prairie, MN (US); Scott Franzen, Savage, MN (US); Tong Zhao, Eden Prairie, MN (US); Xiaoyue Huang, Eden Prairie, MN (US); Steven C. Riemer, Minneapolis, MN (US); Robert Anthony Fernandez, Bloomington, MN (US); Douglas H. Cole, Burnsville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/073,423

(22) Filed: Mar. 17, 2016

(65) Prior Publication Data

US 2016/0275974 A1    Sep. 22, 2016

Related U.S. Application Data

(60) Provisional application No. 62/136,586, filed on Mar. 22, 2015, provisional application No. 62/136,545, filed on Mar. 22, 2015.

(51) Int. Cl.
| | |
|---|---|
| *G11B 5/187* | (2006.01) |
| *G11B 5/40* | (2006.01) |
| *G11B 5/60* | (2006.01) |
| *G11B 5/31* | (2006.01) |
| *G11B 5/00* | (2006.01) |

(52) U.S. Cl.
CPC .............. *G11B 5/40* (2013.01); *G11B 5/187* (2013.01); *G11B 5/3106* (2013.01); *G11B 5/6082* (2013.01); *G11B 2005/0021* (2013.01)

(58) Field of Classification Search
None
See application file for complete search history.

(56) References Cited

U.S. PATENT DOCUMENTS

| | | |
|---|---|---|
| 5,595,825 A | 1/1997 | Guiselin |
| 5,686,548 A | 11/1997 | Grainger |
| 5,989,625 A | 11/1999 | Hilgers |
| 6,006,694 A | 12/1999 | DeOrnellas |
| 6,429,497 B1 | 8/2002 | Nickel |

(Continued)

FOREIGN PATENT DOCUMENTS

WO    WO 2012/120893    9/2012

OTHER PUBLICATIONS

Challener et al., "Heat-Assisted Magnetic Recording by a Near-Field Transducer with Efficient Optical Energy Transfer," Nature Photonics Advance Online Publication, published online Mar. 22, 2009, 5 pgs.

*Primary Examiner* — Brian M Butcher
(74) *Attorney, Agent, or Firm* — Mueting, Raasch & Gebhardt, P.A.

(57) ABSTRACT

Devices having an air bearing surface (ABS), the devices include a write pole; a near field transducer (NFT) including a peg and a disc, wherein the peg is at the ABS of the device; an overcoat, the overcoat including a low surface energy layer.

4 Claims, 4 Drawing Sheets

(56) References Cited

U.S. PATENT DOCUMENTS

| | | | |
|---|---|---|---|
| 6,586,069 B2 | 7/2003 | Dykes | |
| 6,627,302 B1 | 9/2003 | Tang | |
| 6,822,833 B2 | 11/2004 | Yang | |
| 7,147,943 B2 | 12/2006 | Ono | |
| 7,153,597 B2 | 12/2006 | Yang | |
| 8,509,037 B1 * | 8/2013 | Huang | G11B 5/314 360/59 |
| 8,518,563 B2 | 8/2013 | Jones | |
| 9,040,125 B2 | 5/2015 | Jones | |
| 2002/0031615 A1 | 3/2002 | Dykes | |
| 2003/0128483 A1 | 7/2003 | Kamijo | |
| 2004/0161578 A1 | 8/2004 | Chour | |
| 2004/0201926 A1 | 10/2004 | Hancer | |
| 2005/0031907 A1 | 2/2005 | Matsuyama | |
| 2005/0037237 A1 | 2/2005 | Chen | |
| 2006/0177705 A1 | 8/2006 | Ahner | |
| 2006/0266992 A1 | 11/2006 | Matsui | |
| 2007/0042154 A1 | 2/2007 | Hancer | |
| 2007/0127158 A1 | 6/2007 | Tran | |
| 2008/0024923 A1 | 1/2008 | Tomimoto | |
| 2009/0147403 A1 | 6/2009 | Araki | |
| 2010/0002339 A1 * | 1/2010 | Imamura | G11B 5/6005 360/234.3 |
| 2013/0295745 A1 | 11/2013 | Takahashi | |
| 2015/0037613 A1 | 2/2015 | Gokemeijer | |

* cited by examiner

FIG. 3
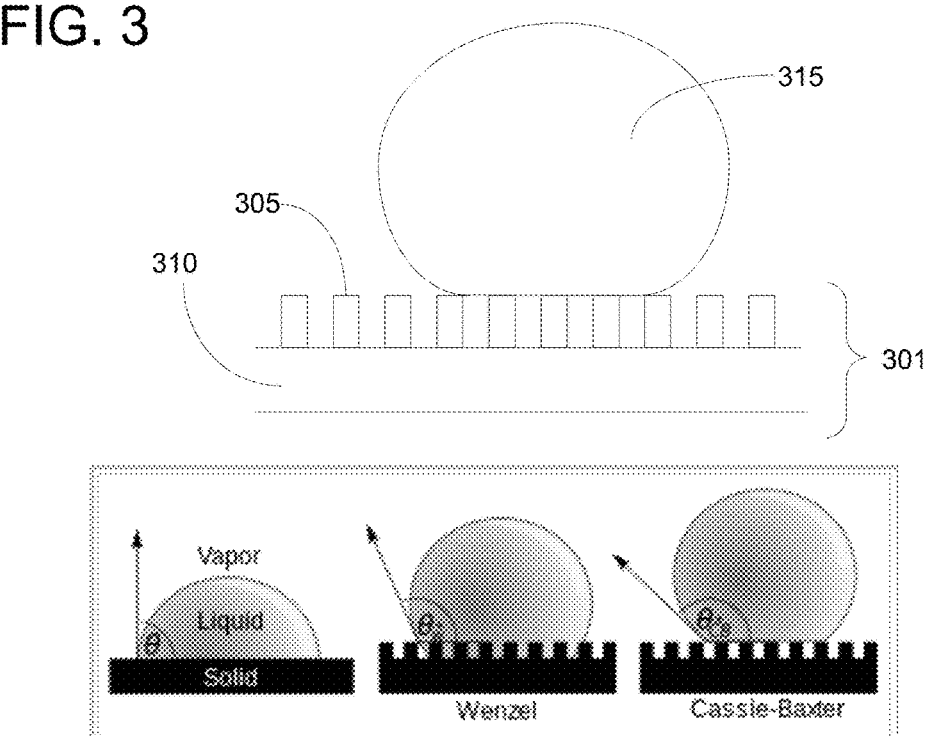
FIG. 4A  FIG. 4B  FIG. 4C
FIG. 5
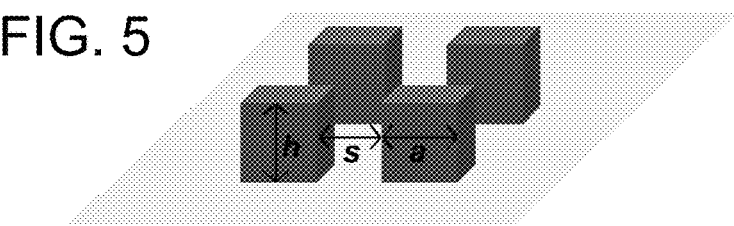

DEVICES INCLUDING AN OVERCOAT LAYER

PRIORITY

This application claims priority to U.S. Provisional Application Nos. 62/136,586 entitled HEAD OVERCOAT WITH LOW SURFACE ENERGY, filed on Mar. 22, 2015 and 62/136,545 entitled, HYDROPHOBIC HEAD OVERCOAT, filed on Mar. 22, 2015, the disclosures of which are incorporated herein by reference thereto.

SUMMARY

Disclosed are devices having an air bearing surface (ABS), the devices include a write pole; a near field transducer (NFT) including a peg and a disc, wherein the peg is at the ABS of the device; an overcoat, the overcoat including a low surface energy layer.

Also disclosed are devices having an air bearing surface (ABS), the devices include a write pole; a near field transducer (NFT) including a peg and a disc, wherein the peg is at the ABS of the device; an overcoat, the overcoat including a low surface energy layer having a contact angle with water of not less than 90°.

Also disclosed are devices that have an air bearing surface (ABS), the method including depositing a substrate layer on a structure that includes a near field transducer (NFT) and a write head; and selectively etching the substrate layer to remove at least part of the substrate layer to form a low energy surface layer having surface topography.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 3 is a cross sectional view of an illustrative water droplet on a structured surface.

FIGS. 4A, 4B and 4C are illustrations depicting the contact angle on a flat surface (FIG. 4A), the Wenzel state on a structured surface (FIG. 4B) and a Cassie-Baxter state on a structured surface (FIG. 4C).

FIG. 5 is an illustration depicting dimensions of a pillars on a surface.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the focused laser beam interacts with lubricant on the magnetic media, the magnetic media itself, and surrounding materials. These interactions, which occur at high temperatures, generate nanoparticles. The nanoparticles tend to accumulate on the surface of the head and build up; this buildup of material can affect the NFT performance and the reliability of the head.

The manufacturing process itself is another source of buildup. During manufacturing of magnetic recording heads (e.g., HAMR heads, perpendicular heads, etc.) particles from the manufacturing environment tend to accumulate on the head surface, leading to serious contamination issues. This can reduce the production yield and increase the production cost of heads.

Due to manufacturing sources, operational sources, or both there remains a need to limit buildup of contaminants on the air bearing surface of magnetic recording heads.

Figure 1:
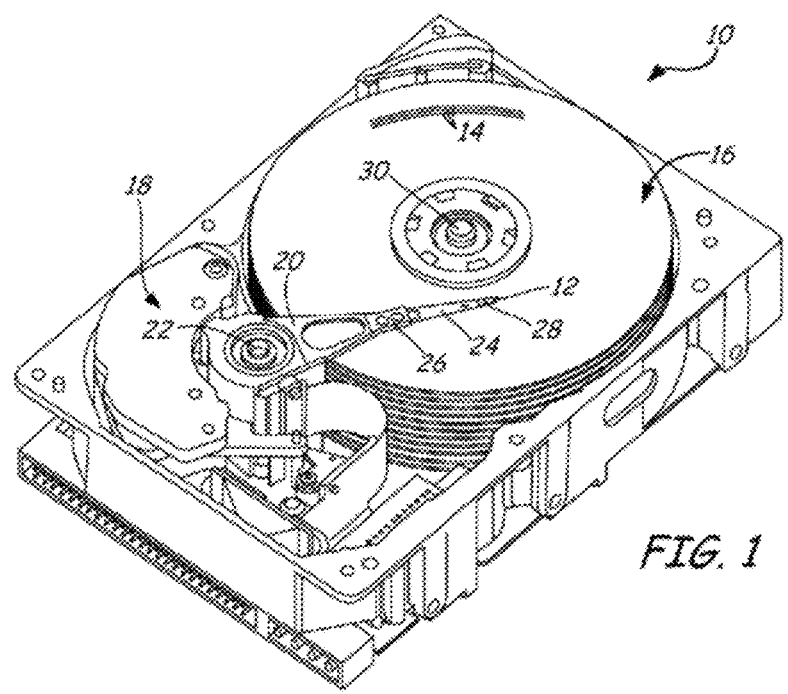
FIG. 1 is a perspective view of a magnetic disc drive that can include HAMR devices.

FIG. 1 is a perspective view of disc drive 10 including an actuation system for positioning slider 12 over track 14 of magnetic medium 16. The system depicted in FIGS. 1 and 2 can include disclosed structures and multilayer gas barrier layers. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
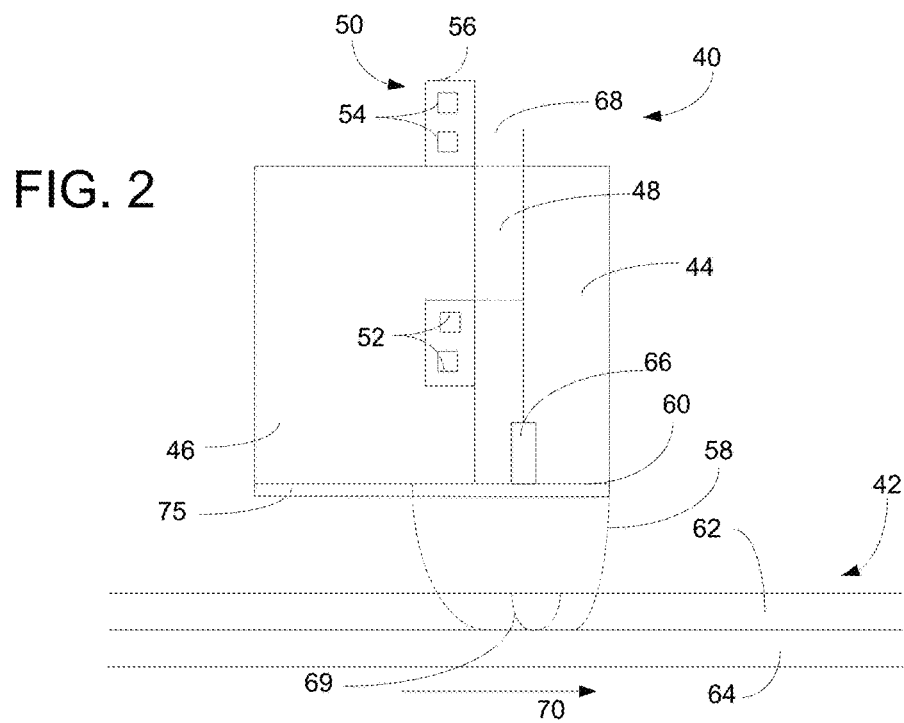
FIG. 2 is a cross sectional view of a HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer (NFT) 66 is positioned adjacent the write pole 44 proximate air bearing surface 60. Positioned over the NFT 66 and optionally over other features in the HAMR magnetic device 40 is an overcoat layer 75. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium. As can be seen in FIG. 2, a portion of the near field transducer is positioned at the ABS 60 of the device.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIGS. 1 and 2.

In disclosed devices, the overcoat, positioned over at least the NFT, includes a layer that has a relatively low surface energy. The term "low surface energy" and variations thereof can refer to the tendency of a surface to resist wetting (high contact angle) or adsorption by other unwanted materials or solutions. In some embodiments, low surface energy surfaces are those in which the molecules are functionalized such that adsorbed and/or absorbed contaminants will have weak physical forces and hence allow for partial wetting (or no wetting, e.g., a very high contact angle) of fluids. This layer can include a layer of material or a layer that has a particular topography or structure. This layer can be referred to as a low surface energy layer.

The low surface energy layer of the overcoat may reduce build up, contamination, or both at the ABS of the device and may thereby also reduce or minimize corrosion at the pole. Furthermore, the low surface energy layer of the overcoat could make it easier to remove already formed buildups of material. In some embodiments, the low surface energy layer is at least partially present at the air bearing surface (ABS) of the device. In some embodiments, the low surface energy layer can be present at least over the writer of the device. In some embodiments, the low surface energy layer can be present over more than just the writer of the device. In some embodiments, the low surface energy layer can be present over substantially the entire ABS. In some embodiments, the low surface energy layer can be added to other overcoat materials, for example diamond like carbon (DLC). In some embodiments, the low surface energy layer can be utilized in place of a DLC layer, e.g., some embodiments of disclosed overcoats do not include a separate DLC layer but only include a low surface energy layer.

The low surface energy layer can be characterized by the contact angle with water of the material making up the layer or the layer itself. In some embodiments, the low surface energy layer can be one that has a contact angle with water of not less than 60°, not less than 80°, not less than 85°, not less than 90°, not less than 95°, not less than 100°, not less than 110°, not less than 120°, not less than 130°, not less than 140°, not less than 150°, or even not less than 160°. In some embodiments, a contact angle of the layer with water can also include an apparent contact angle. An apparent contact angle takes into consideration the material of the layer (for which an actual contact angle could be measured) and the structure of the layer itself or a structure(s) disposed on the layer. The apparent contact angle calculates the effect of the structure(s) based on its geometry and dimensions.

In some embodiments, a low surface energy layer can be formed by functionalizing an already existing surface, depositing a low surface energy layer, chemically forming a layer, or some combination thereof. In some embodiments, the interface between a non-low surface energy layer and a low surface energy layer can be indistinguishable. Stated another way, in some embodiments, a layer already present on or part of a device (e.g., a carbon containing layer) can be modified in a way that some of the existing layer is converted into at least some portion of a low surface energy layer or some of the existing layer can be chemically bonded to a low surface energy material that forms a low surface energy layer.

In some embodiments a layer can be formed by functionalizing an already existing layer, for example using plasma surface functionalization. In some embodiments, plasma containing a halogen(s), (e.g., chlorine (Cl), or fluorine (F)), silicon (Si), oxygen (O), nitrogen (N), or any combination thereof can be utilized. Use of a plasma to functionalize or at least partially functionalize a surface can deposit atoms (F, Si, O, N, C, or combinations thereof) or form functional groups containing such atoms (F, Si, O, N, C, or combinations thereof) on an existing surface. Depending in part, for example, on the plasma energy, the surface layer formed by plasma functionalization could include Si, F, O, N, or any combination thereof atoms (or functional groups containing such atoms and optionally others) bonded to an existing surface, an intermixing layer (including both components from the plasma and components from the existing surface) on an existing surface, or an intermixing layer with Si, F, O, N, or any combination thereof atoms (or functional groups containing such atoms and optionally others) bonded to some portion of the intermixing layer. In some embodiments, the existing surface can be a carbon containing surface (for example a DLC surface).

In some embodiments, the plasma can be generated from gases containing C, F, Si, O, N, or combinations thereof including for example $CHF_3$, $CH_4$, $C_4H_8$, tetramethylsilane (TMS), hexamethyldisiloxane (HMDSO), trimethyl silane (3MS), silicon tetrafluoride ($SiF_4$), nitrogen ($N_2$), oxygen ($O_2$), or any combinations thereof. The plasma can be generated by gas discharges including for example rf discharge, capacitive discharge, inductive discharge, microwave discharge, laser discharge, hot filament discharge, inductively coupled plasma (ICP) discharge, or any combinations thereof. The discharge could be formed in any type of pressure environment including environments having a reduced pressure, atmospheric pressure, or a pressure above 1 atmosphere.

In some embodiments, a low surface energy layer can be formed by depositing a material having a low surface energy. In some embodiments, a thin film deposition method(s) can be utilized. Examples of such methods can include, for example physical vapor deposition (PVD), chemical vapor deposition (CVD), magnetron sputtering, plasma enhanced CVD (PECVD), cathodic arc deposition, laser ablation, laser assisted CVD (LACVD), or any combinations thereof.

In some embodiments, a low surface energy layer can include a carbon based layer or film that includes at least one dopant. The at least one dopant can include any one or more of silicon (Si), titanium (Ti), aluminum (Al), nickel (Ni), boron (B), sulfur (S), yttrium (Y), palladium (Pd), platinum (Pt), hafnium (Hf), chromium (Cr), tungsten (W), zirconium (Zr), niobium (Nb), vanadium (V), molybdenum (Mo), tantalum (Ta), magnesium (Mg), oxygen (O), fluorine (F), nitrogen (N), or any combination thereof. The at least one dopant can include one or more of an oxide, carbide, or nitride of silicon (Si), titanium (Ti), aluminum (Al), nickel (Ni), boron (B), sulfur (S), yttrium (Y), palladium (Pd), platinum (Pt), hafnium (Hf), chromium (Cr), tungsten (W), zirconium (Zr), niobium (Nb), vanadium (V), molybdenum (Mo), tantalum (Ta), magnesium (Mg), oxygen (O), fluorine (F), nitrogen (N), or any combination thereof. In some embodiments, a low surface energy layer can include a carbon based layers or film that includes at one of fluorine (F), silicon (Si), oxygen (O), nitrogen (N), or any combination thereof. In some embodiments, the amount of the dopant can be not greater than 70 atomic percent (at %), not greater than 40 at %, or not greater than 30 at %. In some embodiments, the amount of the dopant can be not less than 0.1 at %, not less than 1 at %, or not less than 5 at %.

In some embodiments the low surface energy layer can be formed using magnetron sputtering, evaporation, cathodic arc discharge, or any combination thereof, a carbon containing solid material could be utilized as a target and gases containing C, F, Si, O, N, or combinations thereof could be added into the deposition chamber during deposition of the material. In some embodiments where the low surface energy layer is deposited using PECVD, gases containing C, F, Si, O, N, or combinations thereof including, for example $CHF_3$, $CH_4$, $C_4H_8$, tetramethylsilane (TMS), hexamethyldisiloxane (HMDSO), trimethyl silane (3MS), silicon tetrafluoride ($SiF_4$), nitrogen ($N_2$), oxygen ($O_2$), or any combinations thereof can be utilized to generate a plasma. The plasma can be generated by gas discharges including for example rf discharge, capacitive discharge, inductive discharge, microwave discharge, laser discharge, hot filament discharge, inductively coupled plasma (ICP) discharge, or any combinations thereof. In some such embodiments, the low surface energy layer can be a layer having a relatively high water contact angle deposited on an existing overcoat structure or layer (e.g., a DLC layer). In some alternative embodiments, the low surface energy layer can be utilized to replace all other overcoat structures or layers because of the low refractive index, low optical absorption, low surface energy, or any combination thereof of the deposited low surface energy layer.

In some embodiments, a low surface energy layer can be formed by chemically forming a low surface energy layer. Illustrative methods can include, for example self-assembled monolayers (SAMs). For example, SAMs containing F, Si, C, O, or combinations thereof could be formed on an existing overcoat structure or layer (e.g., DLC) by dipping, screen printing, brushing, or any combination thereof for example.

In some embodiments, a low surface energy layer that also has a higher resistance to being removed during operation can be added to an overcoat structure. During operation of a HAMR head (as an example of a device to which a low surface energy layer can be added) the DLC containing overcoat directly over the peg of the NFT and the core area is often removed by light absorption by the DLC. To hasten the problem, slightly degraded DLC may be more likely to absorb the light rendering the degradation and oxidation even worse after the initial degradation. In order to combat such degradation, an oxide layer, for example a rare earth oxide layer, which has a relatively low surface energy, can be added to or can replace the overcoat structure. In some embodiments, optional additional low surface energy layers discussed above can also be added to an overcoat that includes a low surface energy layer that has a relatively higher resistance to being removed during operation. Illustrative rare earth oxide layers that may be useful can include, for example lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or any combinations thereof. In some combinations thereof, the rare earth oxide can be chosen from oxides of Ce, Pr, Nd, Pm, Sm, Eu, Gd, Tb, Dy, Ho, Er, Tm, Yb, Lu, or combinations thereof. In some embodiments the oxides, nitrides, or combinations thereof of low-electronegativity metals can also be used in a low surface energy layer. Illustrative low-electronegativity metals may include, zirconium (Zr), yttrium (Y), or combinations thereof. Specific illustrative oxides and nitrides can include for example zirconium oxide (ZrO), zirconium nitride (ZrN), neodymium oxide (NdO), neodymium nitride (NdN), yttrium oxide (YO), yttrium nitride (YN), lanthanum oxide (LaO), lanthanum nitride (LaN), or combinations thereof.

The optional oxide layer can be added, for example between a DLC layer and the device which is being protected. In some embodiments, the structure or device can also contain a gas barrier layer, for example an oxide layer (e.g., not a rare earth oxide layer but a metal oxide layer), an adhesion layer, or a layer that functions as both (e.g, an oxide layer, a multilayer structure that includes more than one oxide each with different properties, or combinations thereof). In some such embodiments, an illustrative structure can include a device (e.g., a HAMR head)/a gas barrier layer (e.g., an oxide layer)/a low surface energy oxide layer (e.g., a rare earth oxide layer)/a DLC layer/a low surface energy layer. The low surface energy layer in such an embodiment can include any of the characteristics discussed above, can be formed using any methods discussed above, or any combinations thereof. In such embodiments, the low surface energy layer can be utilized to protect the device from buildup during low temperature operation, manufacturing, on areas where the low surface energy layer is maintained, or any combination thereof and the low surface energy oxide layer can be utilized to protect the device from buildup in areas where the DLC and overlying low surface energy layer is removed by the laser during operation.

In some embodiments, low surface energy layers can have average thicknesses of not less than 0.01 nanometers (nm), not less than 0.05 nm, or not less than 0.5 nm. In some embodiments, a low surface energy layer can be discontinuous and in such embodiments, the average thickness of a low surface energy layer that is continuous can be not less than 0.5 nm, for example. In some embodiments, a low surface energy layer can include a partial monolayer of the low surface energy material or stated another way the low surface energy material can be discontinuously applied to a surface to form a low surface energy layer. In some embodiments, low surface energy layers can have average thicknesses of not greater than 50 nm, not greater than 5 nm, or not greater than 2 nm.

In some embodiments, a low surface energy layer can include surface features or topography. In some embodiments, a low surface energy layer can include a substrate or base layer. The substrate or base layer may or may not on its own be considered a low surface energy layer. In some embodiments a low surface energy layer may include a substrate that is hydrophilic and surface features or topography that render the low surface energy layer hydrophobic. In some embodiments a low surface energy layer may include a substrate that is hydrophobic and surface features or topography that render the low surface energy layer even more hydrophobic.

Surface features or topography when included in a low surface energy layer function to render the overall layer more hydrophobic by decreasing the functional contact area. Low surface energy layers can include regular or irregular surface features.

This phenomenon is demonstrated in FIG. 3. FIG. 3 shows an illustrative low surface energy layer 301 that includes surface features 305 and a base 310. The base 310 can be a hydrophilic material, a hydrophobic material, or a combination thereof. FIG. 3 shows an illustrative water droplet 315 perched on the upper surfaces of the surface features 305. The surface features 305 trap air between them. The trapped air which forms a portion of the contact surface for the water droplet 315 decreases the contact area of the water and the material that makes up the surface features 305.

This phenomenon can also be demonstrated mathematically. The effective surface area of a surface increases as the surface becomes rough. Water tends to spread more on a rough hydrophilic substrate to develop more solid-liquid contact. Conversely water tends to spread less on a rough hydrophobic substrate to decrease the contact area to the solid. There are two possible solid-water contact regimes on a rough surface: Wenzel state and Cassie-Baxter state. In the Wenzel state the solid and the water are in direct contact. The Wenzel state is illustrated by FIG. 4B (it is thought but not relied upon that the Wenzel state is more likely to occur at the ABS). In the Cassie-Baxter state the solid and water are separated by air. The Cassie-Baxter State is illustrated by FIG. 4C. These can both be contrasted to a water droplet on a smooth surface, which is illustrated in FIG. 4A. The contact angle in all of these scenarios is given as $\theta$. The contact angle on a rough surface can be denoted $\theta_{Rough}$ and the contact angle on a flat surface can be denoted $\theta_{Flat}$. The roughness factor, r equals the rough surface area divided by the flat surface area (r=rough surface area/flat surface area). As such, $\cos(\theta_{Rough})=r\cos(\theta_{Flat})$. From these equations it can be seen that increasing the effective contact area increases contact angle.

In some embodiments a low surface energy layer can include nano-scale surface topography. Nano-scale surface topography refers to features that have dimensions on a nanometer scale. One illustrative method of forming surface features on a nanometer scale includes growth processes in which the deposited material forms islands during the initial stage of growth. In some such embodiments, the islands can have dimensions not greater than 5 nm, or even not greater than 3 nm. The size and density of the islands can be controlled using various process parameters. Some illustrative process parameters can include for example the substrate on which the islands are grown, methods of controlling nucleation, heat treatment, or combinations thereof. For example islands grown on a $SiO_2$ substrate may be different than islands grown on an AlO (which can also be referred to as $Al_2O_3$) substrate, a YO (which can also be referred to as $Y_2O_3$) substrate, or various combinations. As another example, islands grown in a 100% argon (Ar) atmosphere, islands grown in an argon/oxygen atmosphere and islands grown in a 100% oxygen atmosphere may all have different characteristics. Further control could be gained by changing the atmosphere during the growth of the islands.

In some embodiments, a layer deposited in a fashion that provides a relatively rough surface can function to provide a transposed rough surface in an overlying layer. For example a film with a relatively rough surface, e.g., a titanium film deposited via e-beam evaporation, could be used as a substrate for a self-assembled monolayer (SAM) formation. In such an example, the roughness of the underlying titanium film may provide structure or topography to an overlying SAM layer. This effect could even occur in instances where an intervening layer is deposited between the roughly deposited layer and the SAM layer. In a specific illustrative embodiment a roughly deposited layer could be followed by an overcoat layer containing DLC and then a SAM layer could be deposited thereon. The SAM layer in such an example may include surface roughness via the roughly deposited first layer.

A specific illustrative example of a commercially available low surface energy SAM includes 1H,1H,2H,2H-perfluorodecyltrichlorosilane (also known as, heptadecafluoro-1,1,2,2-tetrahydro-decyl-1-trichlorosilane) [CAS: 78560-44-8]. One of skill in the art will understand however, that other low surface energy SAM materials could also be used. In general the class of fluorinated organosilane derivatives could be utilized as low energy SAM materials. Other examples of commercially available low surface energy SAMs include, for example: trifluoropropyltrimethoxysilane, heneicosafluorododecyltrichlorosilane, nonafluorohexyltrimethoxysilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane.

In a specific illustrative example islands formed by depositing a material, for example a template metal, could be used in further processing to affect an underlying surface. For example growth of a template metal, for example gold islands (or any high surface energy material—e.g., rhodium (Rh), tantalum (Ta), etc.) could be used as a template to modify an underlying head overcoat surface. Specifically gold islands would not be affected by HF, but the HF would etch an underlying aluminum oxide (AlO) surface, a silicon oxide (SiO) surface, a tantalum oxide (TaO) surface or any combination thereof. The same phenomenon could allow gold islands to protect an underlying aluminum oxide (AlO) surface, silicon oxide (SiO) surface, or combination surface from being etched using KOH, NaOH, or combinations thereof.

A surface upon which islands are formed has a larger surface area than a flat surface due to the sidewalls of the islands. FIG. 5 illustrates the dimensions of pillars formed on a flat surface. In this illustrative example each pillar has a height, h, a width, a, and a space between the pillars, s. Using these dimensions the increase in surface area provided by islands versus a flat surface can be given by the following equation: Islanded Surface/Flat Surface=$[(s+a)^2+4ah]/(s+a)^2$. Table 1 provides the ratio of the Islanded Surface/Flat Surface for pillars of heights 0.5 nm, 1 nm, 2 nm and 3 nm for a=6 nm and s=3 nm. Table 1 also shows how this ratio affects the contact angle. As seen from table 1, increased Island height can greatly increase in apparent contact angle of a surface.

TABLE 1

| Island Height | Islanded Surface/ Flat Surface | Intrinsic contact angle - flat surface | Apparent Contact angle - Islanded Surface |
|---|---|---|---|
| 0.5 | 1.1 | 120° | 123° |
| 1 | 1.3 | 120° | 131° |
| 2 | 1.6 | 120° | 143° |
| 3 | 1.9 | 120° | 162° |

In some embodiments a substrate layer can include a material that is selectively removable. The substrate layer can be selectively removable with or without a second layer deposited thereon. In some embodiments, the substrate layer can be selectively removed via simple etching of the material. In some embodiments, the substrate layer can be selectively removed by depositing a second material thereon that protects at least part of the substrate layer. In such a case, the substrate layer is selectively removable relative to a second material deposited thereon (e.g., a template metal or an island growth material). A substrate layer can be deposited, and then islands can be grown with the island growth material thereon. The template metal or island growth material can be relatively thin so that the material forms islands and not a continuous film. A continuous film may protect all of the substrate, whereas the islands only protect the portions of the substrate that they cover. Various process parameters including for example nucleation control, heat treatment, or combinations thereof can be utilized to control the dimensions of the islands. For example the more hydrophobic the surface is desired to be, the higher the sides of the islands can be the more islands there can be, or some combination thereof. In some embodiments a heat treatment can be used to control the size, spacing, or both of the islands. Next, substrate layer material can be selectively removed by using the island growth material as a protective mask. This step would form surface topography on or in the substrate layer material. In some embodiments, the island growth material which protected portions of the substrate layer material can then be removed. Such methods could form a layer made of a single material that has surface topography built in.

In some embodiments, specific illustrative methods of the above can include a first step of depositing $Y_2O_3$ (for example) as part of, or an entire overcoat structure. Next, gold (for example) can be deposited on the $Y_2O_3$ layer so that islands of gold are formed. In some embodiments the dimensions of such islands are in the nanometer range, for example not greater than 3 nm. Next, heat treatment, for example at 225° C. for about three hours could be utilized in order to control, modify, or both the dimensions and spacing of the gold islands. Then, an argon (Ar) etch could be utilized to remove the $Y_2O_3$ surface that is not protected by the gold islands. This step creates roughness on or within the $Y_2O_3$ surface and may optionally remove the gold islands. This illustrative method creates $Y_2O_3$ with nanoscale surface roughness.

In other embodiments, specific illustrative methods of the above can include a first step of depositing $Y_2O_3$ (for example) as part of, or an entire overcoat structure. Next, gold (for example) can be deposited on the $Y_2O_3$ layer so that islands of gold are formed. In some embodiments the dimensions of such islands are in the nanometer range, for example not greater than 3 nm. Next, heat treatment, for example at 225° C. for about three hours could be utilized in order to control, modify, or both the dimensions and spacing of the gold islands. Then, a first chemical e.g., a dilute mineral acid, can selectively remove the $Y_2O_3$ that is not protected by the gold islands; and then a second chemical e.g., potassium iodide/iodine solution could selectively remove the gold islands. This illustrative method creates $Y_2O_3$ with nanoscale surface roughness.

In other embodiments, specific illustrative methods of the above can include a first step of depositing $SiO_2$ or AlO (for example) or part of, or an entire overcoat structure. Next, gold (for example) can be deposited on the $SiO_2$ or AlO layer so that islands of gold are formed. In some embodiments the dimensions of such islands are in the nanometer range, for example not greater than 3 nm. Next, heat treatment, for example at 225° C. for about three hours could be utilized in order to control, modify, or both the dimensions and spacing of the gold islands. Then, an argon (Ar) etch or KOH, NaOH, or combinations thereof could be utilized to selectively remove the $SiO_2$ or AlO. Then potassium iodide/iodine solution, for example could selectively remove the gold islands. This illustrative method creates $SiO_2$ or AlO with nanoscale surface roughness. Then a layer of $Y_2O_3$ (for example) could be deposited on the $SiO_2$ or AlO that already includes the nanoscale surface roughness. This illustrative method creates $Y_2O_3$ with nanoscale surface roughness.

In other embodiments, specific illustrative methods of the above can include a first step of depositing $Y_2O_3$ (for example) as part of, or an entire overcoat structure. Then the $Y_2O_3$ can be physically etched, for example using argon (Ar), oxygen ($O_2$), or combinations thereof; chemically etched; or combinations thereof to roughen the $Y_2O_3$ surface. This illustrative method creates $Y_2O_3$ with nanoscale surface roughness.

A layer with surface morphology could also be utilized to provide structure or topography to a protective overcoat material (e.g., an overcoat material, AlO being an example thereof) layer deposited thereon. Illustrative layers that could provide underlying topography (which would get transferred to the overcoat layer material) can include, for example $Y_2O_3$ that had been surface etched either with or without a template metal, AlO that had been surface etched either with or without a template metal, or SiO that had been surface etched either with or without a template metal, for example.

In other embodiments any combinations of the specific illustrative methods given above can be utilized to create a layer with nanoscale surface roughness. Similarly different materials, both of the deposited materials as well as the etchants, different processes or any combination thereof can be utilized.

Example 1

Samples having a 40 Å tantalum oxide (TaO) substrate with a 15 Å diamond like carbon (DLC) overcoat structure formed using filtered cathodic arc deposition were plasma treated in a ICP plasma etching chamber. During the plasma treatment 50 sccm $CF_4$ gas was introduced into the chamber. Table 2 below shows the detailed plasma treatment parameters for each of five (5) samples.

TABLE 2

| Sample | $CF_4$ gas flow (sccm) | Top Power (W) | Pressure (mTorr) | Cathode Temp. (° C.) | Substrate bias (W) | Etch time (seconds) |
| --- | --- | --- | --- | --- | --- | --- |
| 1-1 | 50 | 500 | 15 | 20 | 0 | 30 |
| 1-2 | 50 | 500 | 15 | 20 | 0 | 60 |
| 1-3 | 50 | 500 | 15 | 20 | 0 | 120 |
| 1-4 | 50 | 500 | 15 | 20 | 0 | 240 |
| 1-5 | 50 | 500 | 15 | 20 | 25 | 120 |

The water contact angle was measured using a contact angle meter (MCA-3, Kyowa). The water droplet size was from 90 to 100 picoliters. Three measurements were taken of each sample and the average contact angles are reported below. Table 3 below shows the average water contact angles measured on the five different samples. As can be seen from Table 3, plasma treatment significantly increases the wafer contact angle of the DLC surface from about 60° to a maximum of about 83°. However, at a substrate bias of about 25 W, almost the entire DLC film was sputtered away leading to the exposure of the hydrophilic TaO substrate, which explains the relatively low contact angle of sample 5.

TABLE 3

| Sample | Etch time (seconds) | Bias (W) | Average Contact angle (°) |
|---|---|---|---|
| Untreated | 0 | 0 | 70.9 |
| 1-1 | 30 | 0 | 82.7 |
| 1-2 | 60 | 0 | 93 |
| 1-3 | 120 | 0 | 86.4 |
| 1-4 | 240 | 0 | 83.7 |
| 1-5 | 120 | 25 | 48.4 |

Figure 6:
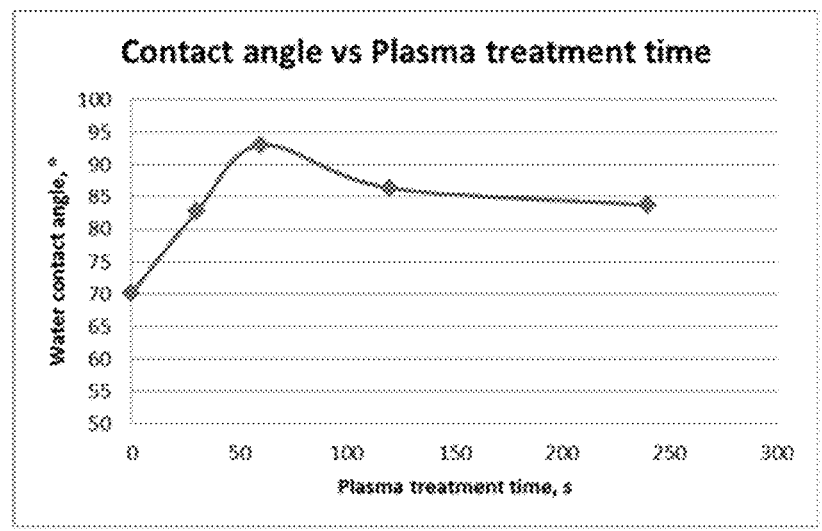
FIG. 6 shows the water contact angle (°) as a function of plasma treatment time (seconds) as found in one of the Examples herein.

FIG. 6 shows the average contact angle plotted versus plasma treatment time. As seen from FIG. 6, the sample treated for 60 seconds shows the highest water contact angle of 93°.

Example 2

To improve the incorporation of fluorine (F) atoms into the DLC film surface, a mixture of $CF_4$ and $CHF_3$ were added to the plasma. Using such a mixture, CF species could be more easily deposited or incorporated into the DLC surface. This will likely promote the incorporation of F atoms into the surface of the DLC film. To reduce the etching effect, the plasma treatment pressure was increased. Three 40 Å TaO and 15 Å DLC samples were plasma treated in a ICP plasma etching chamber. During the plasma treatment, 100 sccm $CF_4$ and 100 $CHF_3$ gas was introduced into the chamber. Table 4 below shows the plasma treatment process parameters.

TABLE 4

| Sample | $CF_4$ gas flow (sccm) | CHF3 gas flow (sccm) | Top Power (W) | Pressure (mTorr) | Substrate bias (W) | Etch time (seconds) |
|---|---|---|---|---|---|---|
| 2-1 | 100 | 100 | 500 | 8 | 0 | 60 |
| 2-2 | 100 | 100 | 500 | 45 | 0 | 60 |
| 2-3 | 100 | 100 | 500 | 45 | 25 | 60 |

The water contact angle was measured using a contact angle meter (MCA-3, Kyowa). The water droplet size was from 90 to 100 picoliters. Three measurements were taken of each sample and the average contact angles are reported below. Table 5 below shows the average water contact angles measured on the three different samples.

TABLE 5

| Sample | Pressure (mTorr) | Etch time (seconds) | Bias (W) | Average Contact angle (°) |
|---|---|---|---|---|
| 2-1 | 8 | 60 | 0 | 105.5 |
| 2-2 | 45 | 60 | 0 | 106.5 |
| 2-3 | 45 | 60 | 25 | 74.5 |

As seen from Table 5, the samples treated using the combination of $CF_4$ and $CHF_3$ had contact angles of about 106°. It can also be seen that plasma treatment pressure doesn't seem to have a significant impact on the contact angle of the formed surface. Again, a substrate bias of about 25 W sputters away almost the entire DLC film leading to the exposure of the hydrophilic substrate.

Example 3

To further improve the incorporation of fluorine (F) atoms into a DLC film, pure $CHF_3$ gas was utilized to plasma treat a DLC surface. A 40 Å TaO and 15 Å DLC sample was plasma treated in a ICP plasma etching chamber. During the plasma treatment, 100 sccm $CHF_3$ gas was introduced into the chamber. Table 6 below shows the plasma treatment process parameters.

TABLE 6

| Sample | $CHF_3$ gas flow (sccm) | Top Power (W) | Pressure (mTorr) | Substrate bias (W) | Etch time (seconds) |
|---|---|---|---|---|---|
| 3-1 | 100 | 500 | 45 | 0 | 60 |

The water contact angle was measured using a contact angle meter (MCA-3, Kyowa). The water droplet size was between 90 to 100 picoliters. Three measurements were taken of the sample and the average contact angle was 116°, which is equivalent to the water contact angle on a self assembled monolayer (SAM) treated surface.

Figure 7A:
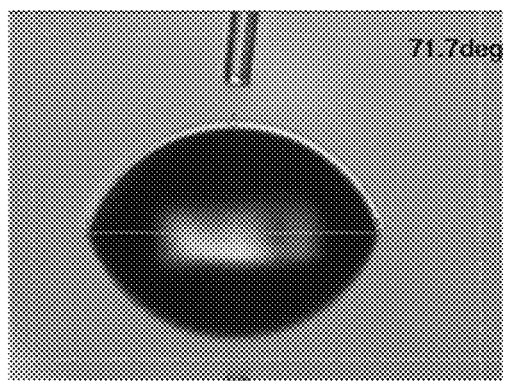
FIGS. 7A and 7B are pictures of a water droplet on a non-treated surface (FIG. 7A) and a plasma treated surface (FIG. 7B).
Figure 7B:
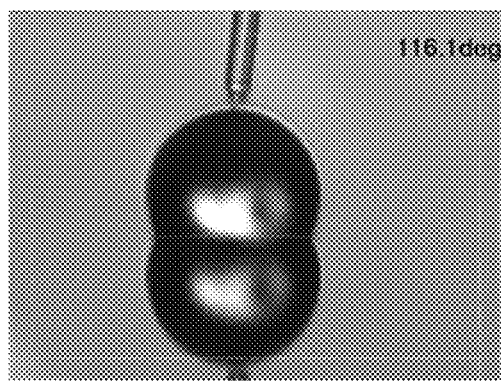

FIGS. 7A and 7B show a water droplet on an untreated DLC (FIG. 7A) and the sample of Example 3 (FIG. 7B).

Example 4

Figure 8A:
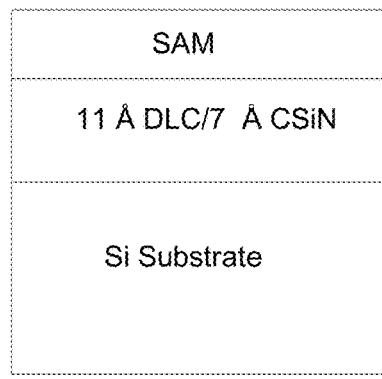
FIGS. 8A, 8B and 8C are schematic illustrations of structures built in one of the Examples herein.
Figure 8B:
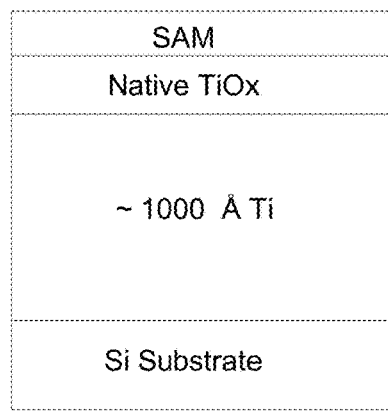
Figure 8C:
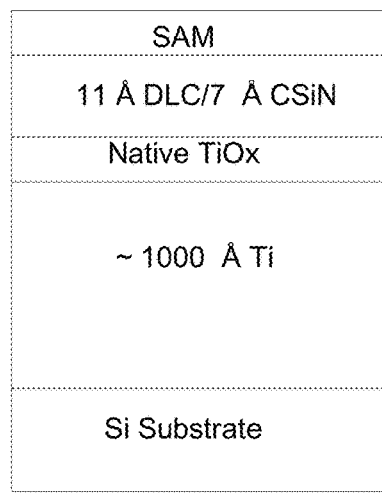

Structures illustrated by FIGS. 8A, 8B and 8C were formed by depositing the films on 3" Si wafers. The Ti layer was deposited via e-beam evaporation. The DLC and CSiN layers were deposited using IBD. The SAM film was deposited using a CVD process.

The precursor compound for forming the SAM coating contains molecules having a head group and a tail with a functional end group. Common head groups include thiols, silanes with hydrolizable reactive groups (e.g., halides: {F, Cl, Br, I}, and alkoxys: {methoxy, ethoxy, propoxy}, phosphonates, etc. Common tail groups include alkyls with 1-18 carbon atoms in addition to other unsaturated hydrocarbon variants, such as, aryl, aralkyl, alkenyl, and alkenyl-aryl. In addition, the hydrocarbons materials listed above can be functionalized with fluorine substitutions, amine terminations, as well as carbon oxygen functional groups such as ketones and alcohols, etc., depending on the desired properties of the resulting SAM coating. In this case, a low surface energy SAM coating was used that displayed hydrophobic and oleophobic properties, i.e. an amphiphobic SAM.

The water contact angles of all of the structures were measured using a microscopic contact angle meter with a typical drop size of 60-80 μm diameter and typical volume of 100-120 picoliters.

The structure of FIG. 8A had a water contact angle of 110°-116°; the structure of FIG. 8B had a water contact angle of greater than 130°; and the structure of FIG. 8C had a water contact angle of greater than 130°. It is thought but not relied upon that the Ti film, which was deposited via e-beam evaporation, was rougher than bare silicon or DLC. The roughness may have been due either to the deposition or due to the formation of native titanium oxide (TiOx). When SAMs are deposited on the titanium layer, the underlying roughness contributes to a higher than expected water contact angle (e.g., the Lotus effect). This explanation would explain why the structure in FIG. 8C behaved more like the structure in FIG. 8B rather than the structure in FIG. 8A.

Typical water contact angles for the particular SAM molecule utilized herein are in the range of 112°-118°.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

As used herein, "about" or "approximately" shall generally mean within 20 percent, within 10 percent, or within 5 percent of a given value or range. "about" can also in some embodiments imply a range dictated by a means of measuring the value at issue. Other than in the examples, or where otherwise indicated, all numbers are to be understood as being modified in all instances by the term "about".

Thus, embodiments of devices including an overcoat layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of forming a low surface energy overcoat the method comprising:
    depositing a substrate layer on a structure comprising a near field transducer (NFT) and a write head;
    depositing a template metal on at least a portion of the substrate layer, wherein the template metal protects the portion of the substrate layer it is deposited on; and
    selectively etching the substrate layer to remove at least part of the substrate layer to form a low energy surface layer having surface topography.

2. The method according to claim 1 further comprising increasing the temperature of the substrate layer having the template metal deposited thereon before selectively etching.

3. The method according to claim 1 further comprising removing the template metal after selectively etching.

4. The method according to claim 1, wherein the substrate layer comprises $Y_2O_3$, $SiO_2$, $Al_2O_3$, or combinations thereof; and the template metal comprises gold (Au), tantalum (Ta), rhodium (Rh), or combinations thereof.

* * * * *